United States Patent [19]
Dosch et al.

[11] Patent Number: 5,404,526
[45] Date of Patent: Apr. 4, 1995

[54] IMPROVED METHOD FOR ACCESSING MACHINE STATE INFORMATION

[76] Inventors: Daniel G. Dosch, 793 Evergreen Rd., Severn, Md. 21144; Otis A. Bundy, 6158 Osage Ct., Sykesville, Md. 21784; Robert Whyms, III, 4754 Ilkley Moor Ln., Ellicott City, Md. 21043

[21] Appl. No.: 963,646

[22] Filed: Oct. 20, 1992

[51] Int. Cl.⁶ .......................................... G01R 31/28
[52] U.S. Cl. ........................... 371/22.1; 364/DIG. 2; 364/921.8; 364/949; 371/16.1; 371/22.5; 395/700
[58] Field of Search ................... 371/22.1, 16.1, 22.5; 395/700, 650; 364/921.8, 949

[56] References Cited

U.S. PATENT DOCUMENTS 5,155,732 10/1992 Jarwala et al. .................... 371/22.3

OTHER PUBLICATIONS

Lester, et al.; "Implementing JTAG Boundary Scan with Methodologies which Minimize Design Overhead"; Apple Computer, Inc.; 1989.
Parker; "The Impact of Boundary Scan on Board Test", Hewlett-Packard; 1989.
Andrews; "JTAG works to standardize chip, board and system self-test", *Computer Design; 1989 Jul.*
Goering; "Boundary-scan technique target board-level testability"; Computer Design; 1987 Oct.
Donlin; "Software generates test patterns for boundary-scan boards"; Computer Design, 1991 Nov.
Breuer, Melvin, et al.; "A Test and Maintenance Controller for a Module Containing Testable Chips"; University of S. California; 1988.

*Primary Examiner*—Kevin A. Kriess
*Assistant Examiner*—Jonathan Hall Backenstose

[57] ABSTRACT

A method is provided for overcoming the slow speed of accessing machine state information from a device under test using boundary scan technology. The method minimizes the total number of words sent over the lengthy communications path by filtering out intermediary data. The method enables transfers of results to take place while other boundary scan circuitry commands are executing. Firmware is provided that transforms a boundary scan circuitry controller into a debug controller. Building the debug functions into the system makes it possible to have debug capability from module level integration all the way to system level integration.

4 Claims, 2 Drawing Sheets

IMPROVED METHOD FOR ACCESSING MACHINE STATE INFORMATION

BACKGROUND OF THE INVENTION

1. Field of the Invention

This invention relates to the field of debug controllers and more particularly to a process for speeding up the accessing of machine state information from a device under test using boundary scan circuitry technology.

2. Description of Related Art

It is a recurring problem in examining devices under test to have such tests conducted at a sufficiently rapid speed. This problem is particularly acute in accessing machine state information from a device under test (DUT) such as a very high speed integrated circuit (VHSIC) processor using boundary scan circuitry technology. The boundary scan circuitry, also called fault isolation test system (FITS), provides the user with access to all of the input/output of all the configurable gate arrays (CGAs) as well as the state of all their testable D flip flops (TDFFs). Current methods of accessing this information are too slow to be useful for debug functions.

In the general prior art methods, access to the boundary scan circuitry is provided by a Universal 1 Configured Gate Array (UNIV) in the boundary scan circuitry controller mode. In this mode, the UNIV can accept boundary scan circuitry commands and pass them on to the target CGA. The commands originate from an external controller, such as a personal computer or a DEC μVAX. The external controller communicates with the boundary scan circuitry controller through test set and console interfaces. In a typical debug function, such as examining a register of a DUT, the external controller might have to use as many as 36 commands, each of which originate in the external controller. This expands into as many as a thousand sixteen-bit words being sent over the communication path.

FIG. 1 shows the steps necessary in the execution of a command in accordance with the current prior art methods. As shown in FIG. 1, external controller 10, such as a personal computer or microvax, generates the commands which are accepted by FITS controller 12 of VHSIC gate array processor 14 and ultimately passed on to the target CGA 16. External controller 10 communicates with FITS controller 12 through test set 18 and console 20. It is the serial communication path between external controller 10 and CGA 16, including the test set interface 22 and console interface 24, which is the primary cause for the slowness of the current prior art methods.

According to the command structure of FIG. 1, the execution of a prior art debug command is completely serial. A command cannot begin until the previous command is complete. This serial process means that many of the resources in the communication path between external controller 10 and CGA 16 such as console 20, FITS controller 12, plate funnel 26 and shop replaceable unit (SRU) funnel 28 are idle throughout the majority of operational time. Moreover, most of the data being sent back and forth between external controller 10 and CGA 16 is intermediary data. The transfer of such data creates a tremendous undesirable over-head.

Attempts have been made to improve the execution speed of boundary scan circuitry routines. Such efforts have focused on improving the interface 22 between the external controller 10 and test set 18 and the interface 24 between test set 18 and console 20. Improvements in these interfaces have provided a single order magnitude of improvement in speed for some projects. Nevertheless, as shown in FIG. 1, the time needed to access a single piece of machine state information may still take up to five seconds. Consequently, there is a need for an improved method of executing debug commands.

SUMMARY OF THE INVENTION

In order to speed up the accessing of machine state information, the method of the present invention minimizes the total number of words which are sent over the entire communications path. This is accomplished by by creating firmware or other programmable memory and providing such firmware on the boundary scan circuitry controller that makes the boundary scan circuitry controller act as a debug controller. The present method filters out intermediary data and also enables transfers of results to take place while other boundary scan circuitry commands are executing. Exploiting these two changes improves resource utilization.

In order to practice the current method, the command repertoire provided in the firmware of the boundary scan circuitry controller is increased to handle some of the repetitive and CGA modification commands. In addition, boundary scan circuitry programs are created that tell the boundary scan circuitry controller how to manipulate the data from the CGAs so only the result data is sent back to the host computer. These commands are written so that they have to be sent from the external controller to the debug controller only one time. After that, only an execute command is necessary to repeat the function. The use of this method has resulted in a drastic reduction in the time needed to access machine state information.

DETAILED DESCRIPTION OF THE PREFERRED EMBODIMENTS

Figure 2:
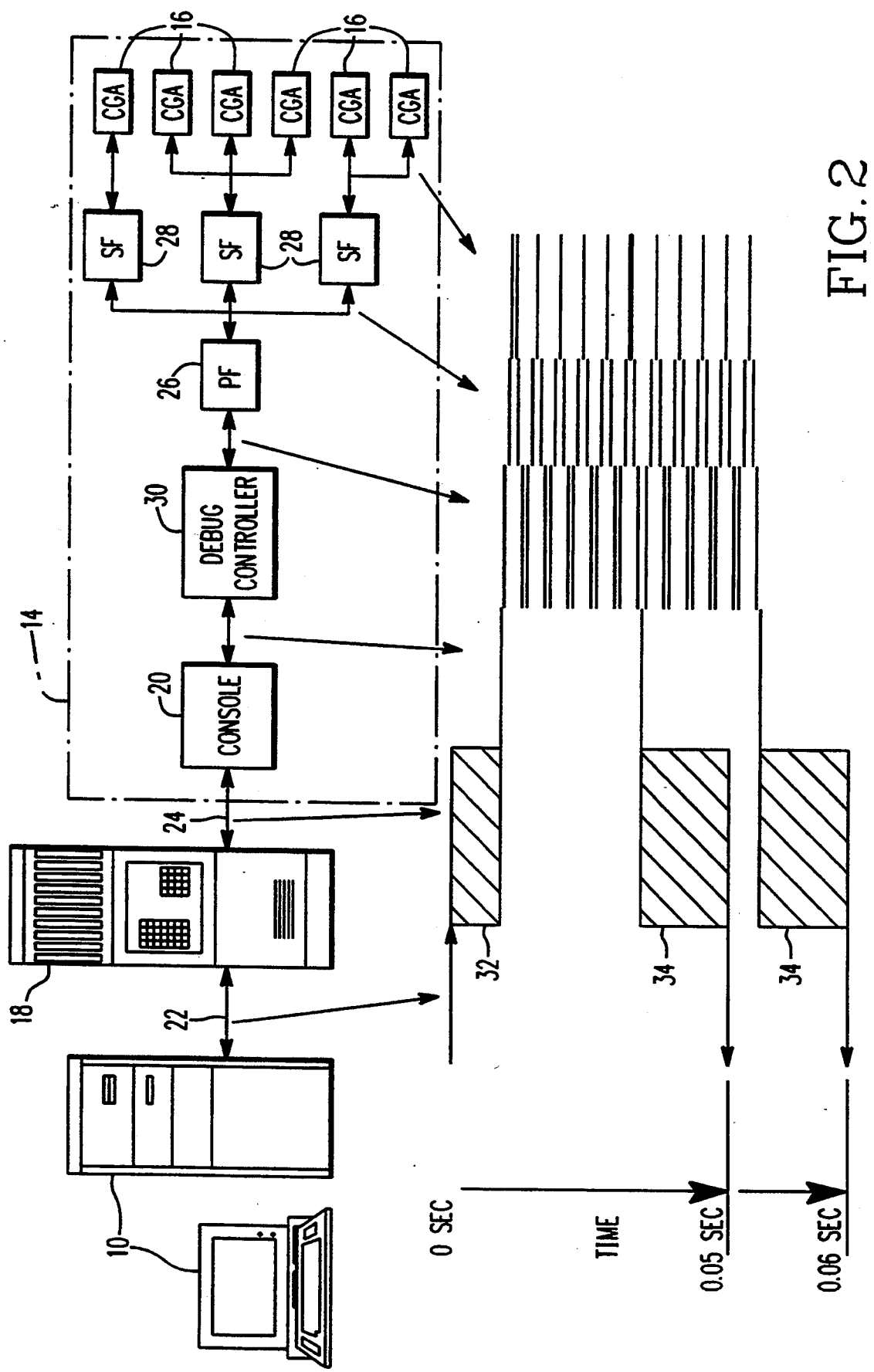
FIG. 2 is a schematic representation of the presently preferred method of the present invention for accessing machine state information.

FIG. 2 illustrates the presently preferred method of the present invention in which the debug functions are embedded in debug controller 30. Providing the debug functions in debug controller 30 provides more efficient use of the available resources by using them in a parallel arrangement instead of in a serial arrangement. The parallel arrangement reduces the bottleneck which occurs at the serial console interface 24 by withholding the transmission of intermediary data. Rather, only the valid result data is sent back to the host computer 10.

In the present method, external controller 10 directs test set 18 to submit an entire boundary scan circuitry command 32 to console 20 for final processing by debug controller 30. Appendix A sets forth examples of the command repertoire for the debug controller 30. Debug controller 30 interfaces with target CGA 16 by sending a series of commands to target CGA 16. Appendix B sets forth examples of the FIT routines for the debug controller 30. Debug controller 30 manipulates the data received from CGA 16. Only result data 34 is sent back to external controller 12 from debug controller 30.

Figure 1:
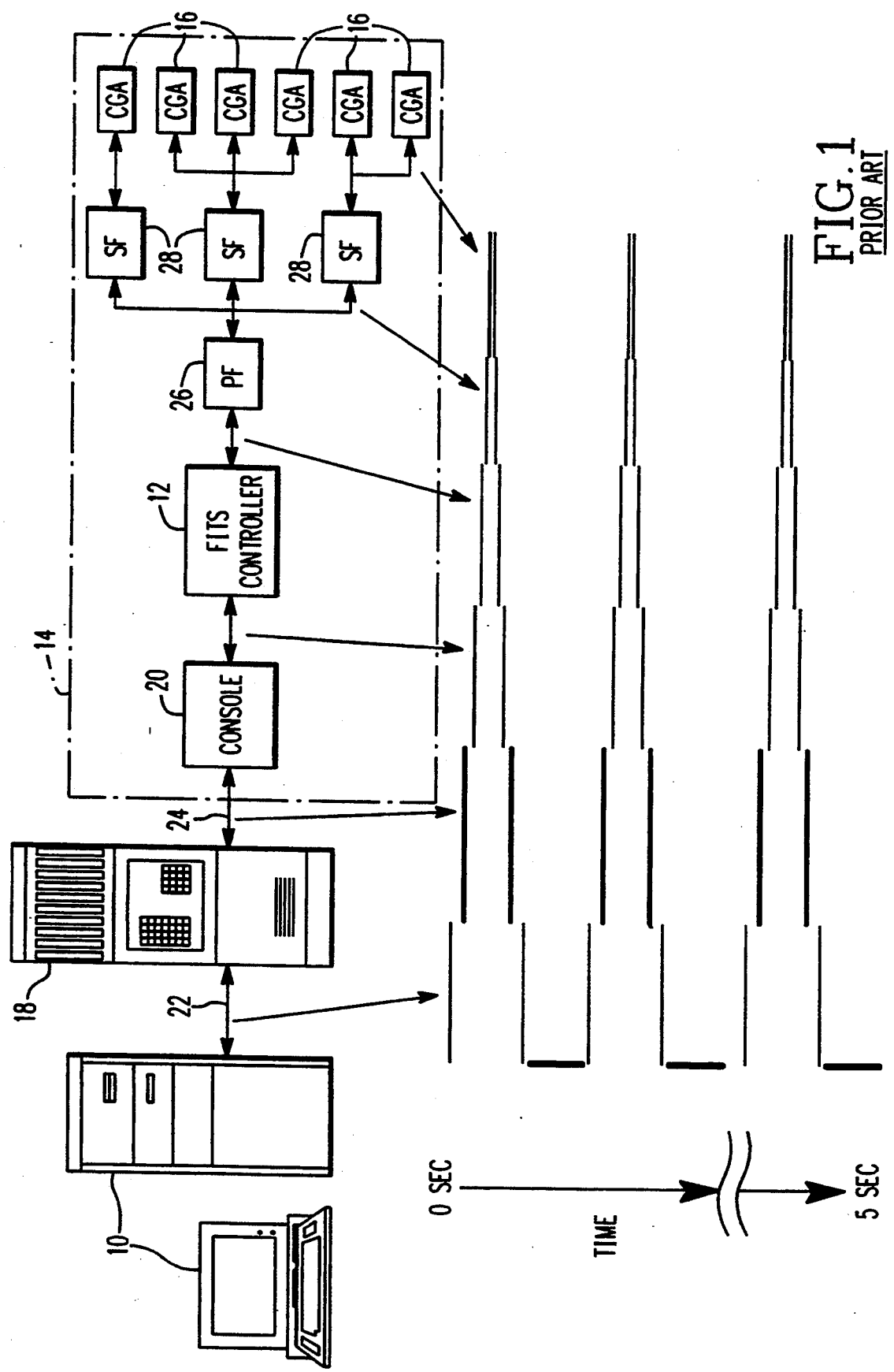
FIG. 1 is a schematic representation of the prior art method for accessing machine state information.

The present invention was demonstrated by testing the time to read the input/output of several CGAs over 100 clocks. Whereas the current prior art method required 100 minutes to read and report the data, the present method needed only two seconds. The reading of signal processing elements (SPE) memory was reduced from 90 minutes/kwords to 2 seconds/kwords. Appendix C sets forth the command repertoire for reading SPE memory using the prior art method of FIG. 1. Appendix D sets forth the far reduced command repertoire needed for the same function using the current method of FIG. 2.

The presently preferred method can be implemented in several ways. First, new commands can be provided in a new firmware segment and down-loaded to unique boundary scan circuitry routines for each type of information requested. Typically, during a debug session, the same information is requested over many clock times. By providing such repetitive commands on firmware, the overhead of sending down new routines is minimized.

A second manner for implementing the present method is to individually tailor routines which are linked to the firmware for each debug scenario requested. This approach requires larger overlays than the first approach and is in the form of executable code rather than in interpreted commands. If this second approach is used, the overlays can be resident in wake-up prom (WWPROM) and simply overlaid when needed.

A third manner for implementing the present method is to provide a completed debug monitor routine resident in the controller firmware. This approach can be used only if sufficient memory is available. This third approach requires a small change to existing hardware, but is desirable for use on all new systems.

Building the debug functions into the system rather than using an external controller to command the boundary scan circuitry makes it possible to have debug capability from module-level integration all the way to system-level integration. The existing interfaces for a target system, such as N-BUS, TM-BUS, PSP-BUS, or the SUBBUS, can be used to access the debug features. Such an arrangement is extremely beneficial in the VHSIC multi-processor environment anticipated for the future.

By employing the present invention, many areas of product development benefit. Hardware designers benefit by decreased hardware verification time. Routines are developed one time and are then accessible to all designers.

Test engineers benefit by decreased test verification time and reduced fault isolation times. The need for auxiliary test equipment is reduced due to the increased machine state visibility. The present invention makes feasible some ideas rejected earlier such as an interconnectivity test and individual CGA ATPG tests. The DEBUG controller can efficiently run an interconnect algorithm and either checksum results or send results back to the host computer for isolation to the faulty area.

Software engineers benefit because the information necessary for software debug becomes available at speeds greater than simulation. System engineers benefit by being able to time or graphically display processes. Support engineers benefit because the same methods used to access system problems can be used to access the problem all the way down to the module level. If the routines are controlled by a common test package, all the different areas are able to use the same commands from level to level and program to program which drastically cuts down the overhead of retraining engineers for new levels of integration or new programs.

The cost to implement this invention is minimal as it depends on the mix of imbedded commands and host-generated commands. Although the present invention requires a small firmware change, most of the firmware is already coded and just needs to be recompiled and linked with the start-up code. If a full debug monitor is desired, more WWPROM memory may be necessary.

In the foregoing specification certain preferred practices and embodiments of this invention have been set out, however, it will be understood that the invention may be otherwise embodied within the scope of the following claims.

APPENDIX A

COMMAND SUMMARY

```
DJMP       0010   count      location
SYNC       0012   maxtime    synwd       location
PACK       0014   #wds_pack  #res_wds    pos0 ... posN
FTDMOD     0016   rdbit      bufnum      [8xxx    locpos0 ... locposN]n    E000
CGASEL     0018   cganum
LDMEM      001A   value      location
INCMEM     001C   location
STOP_CLKS  001E   (handles 5E from old fits commands)
FCRMOD     0020   modbit
FIOMOD     0022   rdbit      bufnum      locpos0 ... locposN
FCHS       0024   #words     location
FISO       0026   cgatype
;UBEND     002E   (handles AE & 6E commands from old fits)
RESUME_LOCAL_CLOCKS   003E   (handles 6E from old fits commands)

note:   110B  first position in fits command buffer for CVP (11CF FOR CFF)
           location, count, syncwd, & value can range in value from 0 -> FFFF
                 location = an absolute address in the fits controller memory
                 count    = the number of times to perform a decrement and count
                            instrction.  If looping on a read command make sure
                            enough memory is available to store all the samples
```

```
syncwd    = the pattern to match against a previously sampled wor
value     = any number that you want initialized. could be used
            to init a DJMP count, a value at a location for FTDMO
            or a sync word, or location to perforn some imaginati
            branching schemes.
#wds_pack = Numers of words to be packed into #res_words. The
            current range is 0 to \24
#res_wds  = number of result words
lcposX    = location/position/end word information. For the MOD c
            If MSB = '1' then the words are defined as follows.
            1110 0 0 0 = end word          = E000
            1100 0 0 0 = invert bit command = C000
                (all position words after this up to next positio
                 word will be used to invert the BIT specified in
                 the buffer.)
            100a aaaa aaaa aaaa = location word where a = address
            If MSB = '0' then the words are defined as follows.
            AABC    AA = word offset into bufnum or location word
                     B = bit position within the word to be modifi
                     C = bit position of word at location used for
                         MSB = F and LSB = 0
pos       = position information for PACK command
            The format is as follows
            AAAB where AAA = word offset into buffer of words to 1
                 &      B  = bit offset into word
rdbit     = number of bits to read. must be a mult of 4 & < \80(
            The format of this word is ABBB where
            A = read/mod only.  1xxx = mod write buffer and write
                                01xx = copy buffer, mod and write
                                00xx = read, mod, and write
            B = number of bits to read, copy and write. not used
bufnum    = buffer number for mod. format of number is 00B0 whe
            B can be from 0 to 7
cgasel    = CGA select word. selects module and CGA.
            format = ABCD where
            A = FD select for module MSB = 1 is for global sel
            B = FC select for module
            C = FD select for CGA MSB = 1 is for global sel
            D = FC select for CGA
modbit    = Specifies which mode control bit is to be set or re
            format = A0BC where
            A = set or reset F=set, 0 = reset
            B = Mode control word to modifiy.  0, 1 or 2 only
            C = bit position within the word.
                MSB = F and LSB = 0
```

***

DJMP — DECREMENT AND JUMP

This routine does a decrement and jump within the FITS program
It reads in the count and if its zero it goes to the next instruction.
If its non-zero the count is decremented and the A3 register (FITS
DATA pointer) is adjusted by the new absaolute location.
The format for this command is

| command 0010 |
| count |
| location |

***

SYNC — SYNC ON A DATA WORD

This routine compares a sync word to the data sampled. If a
match occurs it continues. If it doesn't match then it loops
until either a match occurs or the maxtime is exceeded. The maxtime
is used to help prevent system hangup due to a no sync condition.

The format for this command is

```
| command 0012 |
| maxtime      |
| sync wd      |
| location     |
```

****************************************************************

PACK

This routine takes 'n' words of fits read data and packs the bits into 'm' words of final response data. This command takes a list of bit positions that tell where the data came from. This routine gets executed after each clock to pack the data. The position word is divided into two parts. The lowest nibble contains the bit position in which the bit to be used is located. The upper 12 bits contains the word position of the output stream. So each word describes the origin for that particular BIT. The number of words must be in multiples of 16. A front end compilier could be used to generate this table to make it easier for the user to get the data he wants.

The format for this command is:

```
                16                              4|3        0
              | command word   PACK = 0014.               |
              | number of original words to pack          |
              | number of words to end up with            |
         /    | word   position    0  | bit pos 0 |
        /     | word   position    1  | bit pos 1 |
   FOR        | word   position    2  | bit pos 2 |
  RESULT      | word   position    .  | bit pos . |
   WORD       
    # 1  \    | word   position    N  | bit pos N |
         /    | word   position    0  | bit pos 0 |
        /     | word   position    1  | bit pos 1 |
   FOR        
  RESULT      | word   position    .  | bit pos . |
   WORD       
    # M  \    | word   position    N  | bit pos N |
``` register usage
 A0 = constant 1. used for increments and decrements
 A1 = FFFC used for shift right 4 bits
 A2 = fits result area pointer
 A3 = fits data area pointer
 A4 = scratch usually contains value of current data position
 A5 = scratch - # of words originally read by fits
 A6 = scratch - result word
 A7 = scratch - BIT position n of result word

****************************************************************

FTDMOD  -  a general purpose routine to modify TDFFs

This routine is used to modify bits in the TDFFs. There are three submodes to this command. The first performs a read of n bits from the selected CGA, stores it in one of 8 buffers, modifies the selected bits by the value in location and writes the new value back to the CGA. The second submode retrieves the n bits from the selected buffer, modifies the selected bits by the value in location and writes the new value back to the CGA. The third submode modifies the bits in the write buffer and writes it to the CGA.

The format for this command is

```
            |command 0016|
sm=00=read/mod/write      |sm| num bits |   sub mode/number of bits
   01=copy buf/write      |--|----------|
   1x=mod write buf/write | 0| 0 | # | 0|   buffer number
                          |bit stream|bt|   location/position/end comma:
                          |   . . .     |   location/position/end comma:
                          | F  F  F  F  |   end of command
```

A0 = 1 constant used for inc and dec
A1 = FFFC constant for number of bits to shift & stact pointer
A2 = results area pointer
A3 = data area pointer
A4 = word location
A5 = buffer address
A6 = write buffer offset and IC for subroutine return
A7 = number of words to read

***********************************************************************

CGASEL a short form of the fits cga select commands

This routine is used to select a cga. It takes the
CGA numbers and converts them into the 16 words that
normally make up the CGA select command.
The format for this command is

```
                          |command 0018|
                          |------------|
                          |FD|FC |FD|FC|
```

A0 = 1
A1 = stack pointer
A2 = results area pointer and bit position of modified word
A3 = data area pointer and FFFC for 4 bit right shift
A4 = word within SEL_SHELL to be modified
A5 = bit position in command and word position in bit_map
A6 = bit position within SEL_SHELL wd
A7 = word within read shell to be modified

***********************************************************************

LDMEM - LOAD MEMORY

This routine stores a number at a memory address specified by location
The format for this command is

```
                          |command 001A|
                          |------------|
                          |   number   |
                          |------------|
                          |  location  |
```

***********************************************************************

INCMEM - INCREMENT MEMORY

This routine increments a number at a memory address specified by location
The format for this command is

```
                          |command 001C|
                          |------------|
                          |  location  |
```

***********************************************************************

FCRMOD - a general purpose routine to modify the FITs mode control.

This routine is used to modify one bit in the mode control register of CGAs.
If the MSB of the data
word is a one then the bit specified is set to a one. If the MSB is 0 then
the sepcified bit is reset to a 0. The routine reads 40h bits of mode control, modifies the specified bit, and writes the 40h bits back to the CGA
The format for this command is

```
| command 0020 |
|--------------|
| R/S| word|bit|  reset/set|bit stream positic
```

- A0 = 1 constant used for inc and dec
- A1 = stack pointer
- A2 = results area pointer
- A3 = data area pointer
- A4 = bit position to be set/reset
- A5 = word position to be set/reset
- A6 = scratch and IC for subroutine return
- A7 = FFFC = shift right 4 places

***

FIOMOD - FITS mod of CGA I/O
     This command has the same format and is processed in the same manner as the FTDMOD. See FTDMOD for more details.
The format for this command is

```
| command 0022 |
| sm | num bits |       sub mode/number of bits
| 0| 0 | # | 0 |        buffer number
| bit stream|bt |       location/position/end commar
|    . . .     |        location/position/end commar
| F  F  F  F   |        end of command
``` sm=00=read/mod/write
   01=copy buf/write
   1x=mod write buf/write

***

FCHS  FIT CHECKSUM
     This routine performs a checksum of the last n words read,
     adds it to the value at location and stores the result at location
The format for this command is

```
| command 0024 |
| # words      |
| location     |
```

***

FDATA  -  FITS DATA LOAD

This routine tells the FITS to skip over the number of words specified
This is used for passing data to the FITS for write commands, or tables
of CGA locations etc.
The format for this command is

```
| command 0026  |
| Number of WDs |
```

APPENDIX B

The following is the FIT command used to read spe0 memory.
!
!  TITLE:     RD_SPE0_MEM.FIT
!  PURPOSE:   To read p2 contiguous memory addresses starting at address p1
!  PARAMETERS: p1 = starting address
!              p2 = number of words
!
FITS
FPFF

```
2211
FDSL
!
005E      !STOP CLKS
!
001A      !LDMEM
P1        !VALUE
077F      !LOC1
!
0018      !CGASEL DATASLICE 0
0011      !
!
0016      !FTDMOD
0100      !# OF BITS (RD & WRT)
0000      !BUFFER
877F      !LOC1
03C3
03D2
03E1
03F0
E000      ! END WORD
!
0018      !CGASEL DATASLICE 1
0001      !
!
0016      !FTDMOD
0100      !# OF BITS (RD & WRT)
0010      !BUFFER
877F      !LOC1
03C7
03D6
03E5
03F4
E000      ! END WORD
!
0018      !CGASEL DATASLICE 2
0000      !
!
0016      !FTDMOD
0100      !# OF BITS (RD & WRT)
0020      !BUFFER
877F      !LOC1
03CB
03DA
03E9
03F8
E000      ! END WORD
!
0018      !CGASEL DATASLICE 3
0010      !
!
0016      !FTDMOD
0100      !# OF BITS (RD & WRT)
0030      !BUFFER
877F      !LOC1
03CF
03DE
03ED
03FC
E000      ! END WORD
!
!LOOP:
!
0018      !CGASEL DATASLICE 0
0011      !
FWCR
0008
0020      !INPUTS
FRIO
0038
!!
0018      !CGASEL DATASLICE 1
0001      !
FWCR
```

```
0008
0020      !INPUTS
FRIO
0038
!
0018      !CGASEL DATASLICE 2
0000      !
FWCR
0008
0020      !INPUTS
FRIO
0038
!
0018      !CGASEL DATASLICE 3
0010      !
FWCR
0008
0020      !INPUTS
FRIO
0038
!
0014      !PACK
0010      !# WORDS READ
0001      !# RESULT WDS
0035
0036
0034
0032
0075
0076
0074
0072
00B5
00B6
00B4
00B2
00F5
00F6
00F4
00F2
!
001C      !INCRMEM
077F      !LOC1
!
0018      !CGASEL DATASLICE 0
0011      !
!
0016      !FTDMOD
8100      !# OF BITS (WRT BUF ONLY)
0000      !BUFFER
377F      !LOC1
03C3
03D2
03E1
03F0
000       ! END WORD
!
0018      !CGASEL DATASLICE 1
0001      !
!
0016      !FTDMOD
8100      !# OF BITS (WRT BUF ONLY)
0010      !BUFFER
877F      !LOC1
03C7
03D6
03E5
03F4
2000      ! END WORD
!
0018      !CGASEL DATASLICE 2
0000      !

0016      !FTDMOD
```

```
8100    !# OF BITS (WRT BUF ONLY)
0020    !BUFFER
877F    !LOC1
03CB
03DA
03E9
03F8
E000    ! END WORD
!
0018    !CGASEL DATASLICE 3
0010    !
!
0016    !FTDMOD
8100    !# OF BITS (WRT BUF ONLY)
0030    !BUFFER
877F    !LOC1
03CF
03DE
03ED
03FC
E000    ! END WORD
!
0010    !DECJ
P2      !COUNT
113C    !LOCATION
!
0018    !CGASEL DATASLICE 0
0011    !
!
0016    !FTDMOD
4100    !# OF BITS (WRT BUF ONLY)
0000    !BUFFER
E000    ! END WORD
!
0018    !CGASEL DATASLICE 1
0001    !
!
0016    !FTDMOD
4100    !# OF BITS (WRT BUF ONLY)
0010    !BUFFER
E000    ! END WORD
!
0018    !CGASEL DATASLICE 2
0000    !
!
0016    !FTDMOD
4100    !# OF BITS (WRT BUF ONLY)
0020    !BUFFER
E000    ! END WORD
!
0018    !CGASEL DATASLICE 3
0010    !
!
0016    !FTDMOD
4100    !# OF BITS (WRT BUF ONLY)
0030    !BUFFER
E000    ! END WORD
!
!
FDSL
GO
```

APPENDIX C

This file contains the data transfers between the vax
and the console during a read of spe0 memory for
locations 0 to 10h

```
! Log opened 17-JAN-90 at 09:06:26
SD [VPSP.APC]SPM00_RD
! [VPSP.APC] SPM00_RD
```

```
FEXAMINE SPEO_ADDR SPEO_DATA 0:10
  !VTEST:VTEST Command Type                        :0022
  !VTEST:Length Of Block                           :00C9
  !VTEST:Core Port                                 :FFFF
  !VTEST:Motherplate Slot                          :0000
  !VTEST:SUBBUS Port                               :2211
  !VTEST:Memory Type                               :0000
  !VTEST:Start Address(LSH)                        :0000
  !VTEST:Start Address(MSH)                        :0000
  !VTEST:Code/Data Info Length                     :00C2
E800 005E E800 A00C 0038 0000 0000 0004 00A0 E000 A00C 0038 0000 0000 9004 00AC
 00 A00C 0008 0028 880B 0070 A00C 0008 0008 E800 E800 A00C 0038 0000 0000 0004
 0A0 E000 A00C 0038 0000 0000 1004 00A0 E000 A00C 0008 0028 880B 0070 A00C 0008
0008 E800 E800 A00C 0038 0000 0000 0004 00A0 E000 A00C 0038 0000 0000 0004 00AC
E000 A00C 0008 0028 880B 0070 A00C 0008 0008 E800 E800 A00C 0038 0000 0000 0004
00A0 E000 A00C 0038 0000 0000 8004 00A0 E000 A00C 0008 0028 880B 0070 A00C 0008
0008 E800 E800 A00C 0038 0000 0000 0004 00A0 E000 A00C 0038 0000 0000 1004 00A0
E000 900B 0078 C800 E800 E800 A00C 0038 0000 0000 0004 00A0 E000 A00C 0038 0000
0000 9004 00A0 E000 900B 0090 C800 E800 E800 A00C 0038 0000 0000 0004 00A0 E000
A00C 0038 0000 0000 1004 00A0 E000 900B 0090 C800 E800 E800 A00C 0038 0000 0000
0004 00A0 E000 A00C 0038 0000 0000 0004 00A0 E000 900B 0090 C800 E800 E800 A00C
0038 0000 0000 0004 00A0 E000 A00C 0038 0000 0000 0004 00A0 E000 900B 0090 C800
E800 000E
  !VTEST:VTEST Command Type                        :0023
  !VTEST:Length Of Block                           :0007
  !VTEST:Core Port                                 :FFFF
  !VTEST:Motherplate Slot                          :0000
  !VTEST:SUBBUS Port                               :2211
  !VTEST:Memory Type                               :0000
  !VTEST:Start Address(LSH)                        :0000
  !VTEST:Start Address(MSH)                        :0000
  !VTEST:Code/Data Info Length                     :0000
  !FITS Results:0048
C990 0000 990C 0777 0197 A800 3236 C210 0000 990C 0777 007B A800 303E C310 000C
990C 0777 000F A800 323A C910 0000 990C 0777 0097 0800 3236 FFCD 70FF 0474 FFB3
0067 44C8 027C 7F02 0044 0000 0081 B985 1574 A648 52C0 BB0F B5BB 0044 0000 0081
5705 1574 A648 51C0 550F 5555 0044 0000 0081 7005 1574 A648 53C0 770F 7577 0044
0000 0081 B100 1574 0648 F2C0 BB0F B0BB
  !VTEST:VTEST Command Type                        :0022
  !VTEST:Length Of Block                           :00FA
  !VTEST:Core Port                                 :FFFF
  !VTEST:Motherplate Slot                          :0000
  !VTEST:SUBBUS Port                               :2211
  !VTEST:Memory Type                               :0000
  !VTEST:Start Address(LSH)                        :0000
  !VTEST:Start Address(MSH)                        :0000
  !VTEST:Code/Data Info Length                     :00F3
E800 005E E800 A00C 0038 0000 0000 0004 00A0 E000 A00C 0038 0000 0000 1004 00A0
E000 B00C 0078 FFCD 70FF 0474 FFB3 0027 44C8 027C 7F02 D000 C800 E800 E800 A00C
0038 0000 0000 0004 00A0 E000 A00C 0038 0000 0000 9004 00A0 E000 B00C 0090 0044
0000 0081 0985 1574 A648 52C0 BB0F B5BB D000 C800 E800 E800 A00C 0038 0000 000C
0004 00A0 E000 A00C 0038 0000 0000 1004 00A0 E000 B00C 0090 0044 0000 0081 0705
1574 A648 51C0 550F 5555 D000 C800 E800 A00C 0038 0000 0000 0004 00A0 E000
A00C 0038 0000 0000 0004 00A0 E000 B00C 0090 0044 0000 0081 0005 1574 A648 53C0
770F 7577 D000 C800 E800 E800 A00C 0038 0000 0000 0004 00A0 E000 A00C 0038 000C
0000 8004 00A0 E000 B00C 0090 0044 0000 0081 3100 1574 0648 F2C0 BB0F B0BB D000
C800 E800 E800 A00C 0038 0000 0000 0004 00A0 E000 A00C 0038 0000 0000 9004 00A0
E000 A00C 0008 0028 880B 0070 A00C 0008 0008 E800 E800 A00C 0038 0000 0000 0004
00A0 E000 A00C 0038 0000 0000 1004 00A0 E000 A00C 0008 0028 880B 0070 A00C 0008
0008 E800 E800 A00C 0038 0000 0000 0004 00A0 E000 A00C 0038 0000 0000 0004 00A0
E000 A00C 0008 0028 880B 0070 A00C 0008 0008 E800 E800 A00C 0038 0000 0000 0004
00A0 E000 A00C 0038 0000 0000 8004 00A0 E000 A00C 0008 0028 880B 0070 A00C 0008
0008 E800 000E
  !VTEST:VTEST Command Type                        :0023
  !VTEST:Length Of Block                           :0007
  !VTEST:Core Port                                 :FFFF
  !VTEST:Motherplate Slot                          :0000
  !VTEST:SUBBUS Port                               :2211
  !VTEST:Memory Type                               :0000
  !VTEST:Start Address(LSH)                        :0000
  !VTEST:Start Address(MSH)                        :0000
  !VTEST:Code/Data Info Length                     :0000
  !FITS Results:001C
9990 0000 990C 0703 0197 A800 3236 C210 0000 990C 0703 007B A800 303E C310 000C
```

```
990C 0703 000F A800 323A C910 0000 990C 0703 0097 0800 3236
```
| | |
|---|---|
| VTEST:VTEST Command Type | :0022 |
| VTEST:Length Of Block | :00FA |
| VTEST:Core Port | :FFFF |
| VTEST:Motherplate Slot | :0000 |
| VTEST:SUBBUS Port | :2211 |
| VTEST:Memory Type | :0000 |
| VTEST:Start Address(LSH) | :0000 |
| VTEST:Start Address(MSH) | :0000 |
| TEST:Code/Data Info Length | :00F3 |

```
E800 005E E800 A00C 0038 0000 0000 0004 00A0 E000 A00C
0038 0000 0000 1004 00A1 E000 B00C 0078 FFCD 70FF 0474 FFB3 0027 44C8 027C 7F02
D000 C800 E800 E800 A00C 0038 0000 0000 0004 00A0 E000 A00C 0038 0000 0000 9004
00A0 E000 B00C 0090 0044 0000 0081 8985 1574 A648 52C0 BB0F B5BB D000 C800 E800
800 A00C 0038 0000 0000 0004 00A0 E000 A00C 0038 0000 0000 1004 00A0 E000 B00C
0090 0044 0000 0081 0705 1574 A648 51C0 550F 5555 D000 C800 E800 E800 A00C 0038
0000 0000 0004 00A0 E000 A00C 0038 0000 0000 0004 00A0 E000 B00C 0090 0044 0000
0081 0005 1574 A648 53C0 770F 7577 D000 C800 E800 E800 A00C 0038 0000 0000 0004
00A0 E000 A00C 0038 0000 0000 8004 00A0 E000 B00C 0090 0044 0000 0081 3100 1574
0648 F2C0 BB0F B0BB D000 C800 E800 E800 A00C 0038 0000 0000 0004 00A0 E000 A00C
0038 0000 0000 9004 00A0 E000 A00C 0008 0028 880B 0070 A00C 0008 0008 E800 E800
A00C 0038 0000 0000 0004 00A0 E000 A00C 0038 0000 0000 1004 00A0 E000 A00C 0008
0028 880B 0070 A00C 0008 0008 E800 E800 A00C 0038 0000 0000 0004 00A0 E000 A00C
0038 0000 0000 0004 00A0 E000 A00C 0008 0028 880B 0070 A00C 00C8 0008 E800 E800
A00C 0038 0000 0000 0004 00A0 E000 A00C 0038 0000 0000 8004 00A0 E000 A00C 0008
0028 880B 0070 A00C 0008 0008 E800 000E
```
| | |
|---|---|
| VTEST:VTEST Command Type | :0023 |
| VTEST:Length Of Block | :0007 |
| VTEST:Core Port | :FFFF |
| VTEST:Motherplate Slot | :0000 |
| VTEST:SUBBUS Port | :2211 |
| VTEST:Memory Type | :0000 |
| VTEST:Start Address(LSH) | :0000 |
| VTEST:Start Address(MSH) | :0000 |
| VTEST:Code/Data Info Length | :0000 |

FITS Results:
```
001C C990 0000 990C 0723 0197 A800 3236 C210 0000 990C 0703 007B A800 303E
C310 0000 990C 0703 000F A800 323A C910 0000 990C 0703 0097 0800 3236
```
| | |
|---|---|
| VTEST:VTEST Command Type | :0022 |
| VTEST:Length Of Block | :00FA |
| VTEST:Core Port | :FFFF |
| VTEST:Motherplate Slot | :0000 |
| VTEST:SUBBUS Port | :2211 |
| VTEST:Memory Type | :0000 |
| VTEST:Start Address(LSH) | :0000 |
| VTEST:Start Address(MSH) | :0000 |
| VTEST:Code/Data Info Length | :00F3 |

```
E800 005E E800 A00C 0038 0000 0000 0004 00A0
E000 A00C 0038 0000 0000 1004 00A1 E000 B00C 0078 FFCD 70FF 0474 FFB3 0027 44C8
027C 7F02 D000 C800 E800 E800 A00C 0038 0000 0000 0004 00A0 E000 A00C 0038 0000
0000 9004 00A0 E000 B00C 0090 0044 0000 0081 4985 1574 A648 52C0 BB0F B5BB D000
C800 E800 E800 A00C 0038 0000 0000 0004 00A0 E000 A00C 0038 0000 0000 1004 00A0
E000 B00C 0090 0044 0000 0081 0705 1574 A648 51C0 550F 5555 D000 C800 E800 E800
A00C 0038 0000 0000 0004 00A0 E000 A00C 0038 0000 0000 0004 00A0 E000 B00C 0090
0044 0000 0081 0005 1574 A648 53C0 770F 7577 D000 C800 E800 E800 A00C 0038 0000
0000 0004 00A0 E000 A00C 0038 0000 0000 8004 00A0 E000 B00C 0090 0044 0000 0081
3100 1574 0648 F2C0 BB0F B0BB D000 C800 E800 E800 A00C 0038 0000 0000 0004 00A0
000 A00C 0038 0000 0000 9004 00A0 E000 A00C 0008 0028 880B 0070 A00C 0008 0008
E800 E800 A00C 0038 0000 0000 0004 00A0 E000 A00C 0038 0000 0000 1004 00A0 E000
A00C 0008 0028 880B 0070 A00C 0008 0008 E800 E800 A00C 0038 0000 0000 0004 00A0
E000 A00C 0038 0000 0000 0004 00A0 E000 A00C 0008 0028 880B 0070 A00C 0008 0008
E800 E800 A00C 0038 0000 0000 0004 00A0 E000 A00C 0038 0000 0000 8004 00A0 E000
A00C 0008 0028 880B 0070 A00C 0008 0008 E800 000E
```
| | |
|---|---|
| VTEST:VTEST Command Type | :0023 |
| VTEST:Length Of Block | :0007 |
| VTEST:Core Port | :FFFF |
| VTEST:Motherplate Slot | :0000 |
| VTEST:SUBBUS Port | :2211 |
| VTEST:Memory Type | :0000 |
| TEST:Start Address(LSH) | :0000 |
| TEST:Start Address(MSH) | :0000 |
| VTEST:Code/Data Info Length | :0000 |

FITS Results:
```
001C C990 0000 990C 0743 0197 A800 3236 C210 0000 990C 0703 007B
```

300 303E C310 0000 990C 0703 000F A800 323A C910 0000 990C 0703 0097 0800 3236
VTEST:VTEST Command Type                :0022
VTEST:Length Of Block                   :00FA
VTEST:Core Port                         :FFFF
VTEST:Motherplate Slot                  :0000
VTEST:SUBBUS Port                       :2211
VTEST:Memory Type                       :0000
VTEST:Start Address(LSH)                :0000
VTEST:Start Address(MSH)                :0000
VTEST:Code/Data Info Length             :00F3
E800 005E E800 A00C 0038 0000 0000
0004 00A0 E000 A00C 0038 0000 0000 1004 00A1 E000 B00C 0078 FFCD 70FF 0474 FFB3
0027 44C8 027C 7F02 D000 C800 E800 E800 A00C 0038 0000 0000 0004 00A0 E000 A00C
0038 0000 0000 9004 00A0 E000 B00C 0090 0044 0000 0081 C985 1574 A648 52C0 BB0F
B5BB D000 C800 E800 E800 A00C 0038 0000 0000 0004 00A0 E000 A00C 0038 0000 0000
1004 00A0 E000 B00C 0090 0044 0000 0081 0705 1574 A648 51C0 550F 5555 D000 C800
E800 E800 A00C 0038 0000 0000 0004 00A0 E000 A00C 0038 0000 0000 0004 00A0 E000
B00C 0090 0044 0000 0081 0005 1574 A648 53C0 770F 7577 D000 C800 E800 E800 A00C
0038 0000 0000 0004 00A0 E000 A00C 0038 0000 0000 8004 00A0 E000 B00C 0090 004.
0000 0081 3100 1574 0648 F2C0 BB0F B0BB D000 C800 E800 E800 A00C 0038 0000 0000
0004 00A0 E000 A00C 0038 0000 0000 9004 00A0 E000 A00C 0008 0028 880B 0070 A00C
0008 0008 E800 E800 A00C 0038 0000 0000 0004 00A0 E000 A00C 0038 0000 0000 100.
00A0 E000 A00C 0008 0028 880B 0070 A00C 0008 0008 E800 E800 A00C 0038 0000 0000
0004 00A0 E000 A00C 0038 0000 0000 0004 00A0 E000 A00C 0008 0028 880B 0070 A00C
0008 0008 E800 E800 A00C 0038 0000 0000 0004 00A0 E000 A00C 0038 0000 0000 A00C
00A0 E000 A00C 0008 0028 880B 0070 A00C 0008 0008 E800 000E
VTEST:VTEST Command Type                :0023
VTEST:Length Of Block                   :0007
VTEST:Core Port                         :FFFF
VTEST:Motherplate Slot                  :0000
VTEST:SUBBUS Port                       :2211
VTEST:Memory Type                       :0000
VTEST:Start Address(LSH)                :0000
VTEST:Start Address(MSH)                :0000
VTEST:Code/Data Info Length             :0000
FITS Results:
001C C990 0000 990C 0763 0197 A800 3236 C210 0000 990C 0703 007B A800 303E
C310 0000 990C 0703 000F A800 323A C910 0000 990C 0703 0097 0800 3236

TEST:VTEST Command Type                 :0022
VTEST:Length Of Block                   :00FA
VTEST:Core Port                         :FFFF
VTEST:Motherplate Slot                  :0000
TEST:SUBBUS Port                        :2211
VTEST:Memory Type                       :0000
VTEST:Start Address(LSH)                :0000
VTEST:Start Address(MSH)                :0000
VTEST:Code/Data Info Length             :00F3
E800 005E E800 A00C 0038
0000 0000 0004 00A0 E000 A00C 0038 0000 0000 1004 00A1 E000 B00C 0078 FFCD 70FF
0474 FFB3 0027 44C8 027C 7F02 D000 C800 E800 E800 A00C 0038 0000 0000 0004 00A0
E000 A00C 0038 0000 0000 9004 00A0 E000 B00C 0090 0044 0000 0081 2985 1574 A648
52C0 BB0F B5BB D000 C800 E800 E800 A00C 0038 0000 0000 0004 00A0 E000 A00C 0038
0000 0000 1004 00A0 E000 B00C 0090 0044 0000 0081 0705 1574 A648 51C0 550F 5555
D000 C800 E800 E800 A00C 0038 0000 0000 0004 00A0 E000 A00C 0038 0000 0000 0004
0A0 E000 B00C 0090 0044 0000 0081 0005 1574 A648 53C0 770F 7577 D000 C800 E800
E800 A00C 0038 0000 0000 0004 00A0 E000 A00C 0038 0000 0000 8004 00A0 E000 B00C
0090 0044 0000 0081 3100 1574 0648 F2C0 BB0F B0BB D000 C800 E800 E800 A00C 0038
0000 0000 0004 00A0 E000 A00C 0038 0000 0000 9004 00A0 E000 A00C 0008 0028 880B
0070 A00C 0008 0008 E800 E800 A00C 0038 0000 0000 0004 00A0 E000 A00C 0038 0000
000 1004 00A0 E000 A00C 0008 0028 880B 0070 A00C 0008 0008 E800 E800 A00C 0038
0000 0000 0004 00A0 E000 A00C 0038 0000 0000 0004 00A0 E000 A00C 0008 0028 880B
0070 A00C 0008 0008 E800 E800 A00C 0038 0000 0000 0004 00A0 E000 A00C 0038 0000
0000 8004 00A0 E000 A00C 0008 0028 880B 0070 A00C 0008 0008 E800 000E
VTEST:VTEST Command Type                :0023
VTEST:Length Of Block                   :0007
VTEST:Core Port                         :FFFF
VTEST:Motherplate Slot                  :0000
VTEST:SUBBUS Port                       :2211
VTEST:Memory Type                       :0000
VTEST:Start Address(LSH)                :0000
VTEST:Start Address(MSH)                :0000
VTEST:Code/Data Info Length             :0000
FITS Results:

```
001C C990 0000 990C 0713 0197 A800 3236 C210 0000 990C 0703 007B A800 303E
C310 0000 990C 0703 000F A800 323A C910 0000 990C 0703 0097 0800 3236
```

| | |
|---|---|
| VTEST:VTEST Command Type | :0022 |
| VTEST:Length Of Block | :00FA |
| VTEST:Core Port | :FFFF |
| VTEST:Motherplate Slot | :0000 |
| VTEST:SUBBUS Port | :2211 |
| VTEST:Memory Type | :0000 |
| VTEST:Start Address(LSH) | :0000 |
| VTEST:Start Address(MSH) | :0000 |
| VTEST:Code/Data Info Length | :00F3 |

```
E800 005E E800
A00C 0038 0000 0000 0004 00A0 E000 A00C 0038 0000 0000 1004 00A1 E000 B00C 007£
FFCD 70FF 0474 FFB3 0027 44C8 027C 7F02 D000 C800 E800 E800 A00C 0038 0000 000(
0004 00A0 E000 A00C 0038 0000 0000 9004 00A0 E000 B00C 0090 0044 0000 0081 A98!
1574 A648 52C0 BB0F B5BB D000 C800 E800 E800 A00C 0038 0000 0000 0004 00A0 E00(
A00C 0038 0000 0000 1004 00A0 E000 B00C 0090 0044 0000 0081 0705 1574 A648 51C(
550F 5555 D000 C800 E800 E800 A00C 0038 0000 0000 0004 00A0 E000 A00C 0038 000(
0000 0004 00A0 E000 B00C 0090 0044 0000 0081 0005 1574 A648 53C0 770F 7577 D00(
C800 E800 E800 A00C 0038 0000 0000 0004 00A0 E000 A00C 0038 0000 0000 8004 00A(
E000 B00C 0090 0044 0000 0081 3100 1574 0648 F2C0 BB0F B0BB D000 C800 E800 E80(
A00C 0038 0000 0000 0004 00A0 E000 A00C 0038 0000 0000 9004 00A0 E000 A00C 000£
0028 880B 0070 A00C 0008 0008 E800 E800 A00C 0038 0000 0000 0004 00A0 E000 A00(
ᴖ038 0000 0000 1004 00A0 E000 A00C 0008 0028 880B 0070 A00C 0008 0008 E800 E80(
.00C 0038 0000 0000 0004 00A0 E000 A00C 0038 0000 0000 0004 00A0 E000 A00C 000£
0028 880B 0070 A00C 0008 0008 E800 E800 A00C 0038 0000 0000 0004 00A0 E000 A00(
0038 0000 0000 8004 00A0 E000 A00C 0008 0028 880B 0070 A00C 0008 0008 E800 000]
```

| | |
|---|---|
| VTEST:VTEST Command Type | :0023 |
| TEST:Length Of Block | :0007 |
| ᴠTEST:Core Port | :FFFF |
| VTEST:Motherplate Slot | :0000 |
| VTEST:SUBBUS Port | :2211 |
| VTEST:Memory Type | :0000 |
| VTEST:Start Address(LSH) | :0000 |
| VTEST:Start Address(MSH) | :0000 |
| VTEST:Code/Data Info Length | :0000 |

FITS Results:
```
001C C990 0000 990C 0733 0197 A800 3236 C210 0000 990C 0703 007B A800 303E
C310 0000 990C 0703 000F A800 323A C910 0000 990C 0703 0097 0800 3236
```

| | |
|---|---|
| TEST:VTEST Command Type | :0022 |
| ᴠTEST:Length Of Block | :00FA |
| VTEST:Core Port | :FFFF |
| VTEST:Motherplate Slot | :0000 |
| ᴠTEST:SUBBUS Port | :2211 |
| TEST:Memory Type | :0000 |
| VTEST:Start Address(LSH) | :0000 |
| VTEST:Start Address(MSH) | :0000 |
| VTEST:Code/Data Info Length | :00F3 |

```
E800
005E E800 A00C 0038 0000 0000 0004 00A0 E000 A00C 0038 0000 0000 1004 00A1 E00(
B00C 0078 FFCD 70FF 0474 FFB3 0027 44C8 027C 7F02 D000 C800 E800 E800 A00C 003£
0000 0000 0004 00A0 E000 A00C 0038 0000 0000 9004 00A0 E000 B00C 0090 0044 000(
0081 6985 1574 A648 52C0 BB0F B5BB D000 C800 E800 E800 A00C 0038 0000 0000 000·
00A0 E000 A00C 0038 0000 0000 1004 00A0 E000 B00C 0090 0044 0000 0081 0705 157·
A648 51C0 550F 5555 D000 C800 E800 E800 A00C 0038 0000 0000 0004 00A0 E000 A00(
0038 0000 0000 0004 00A0 E000 B00C 0090 0044 0000 0081 0005 1574 A648 53C0 770]
7577 D000 C800 E800 E800 A00C 0038 0000 0000 0004 00A0 E000 A00C 0038 0000 000(
8004 00A0 E000 B00C 0090 0044 0000 0081 3100 1574 0648 F2C0 BB0F B0BB D000 C80(
E800 E800 A00C 0038 0000 0000 0004 00A0 E000 A00C 0038 0000 0000 9004 00A0 E00(
.A00C 0008 0028 880B 0070 A00C 0008 0008 E800 E800 A00C 0038 0000 0000 0004 00A(
E000 A00C 0038 0000 0000 1004 00A0 E000 A00C 0008 0028 880B 0070 A00C 0008 000·
E800 E800 A00C 0038 0000 0000 0004 00A0 E000 A00C 0038 0000 0000 0004 00A0 E00(
A00C 0008 0028 880B 0070 A00C 0008 0008 E800 E800 A00C 0038 0000 0000 0004 00A(
E000 A00C 0038 0000 0000 8004 00A0 E000 A00C 0008 0028 880B 0070 A00C 0008 000:
E800 000E
```

| | |
|---|---|
| VTEST:VTEST Command Type | :0023 |
| VTEST:Length Of Block | :0007 |
| VTEST:Core Port | :FFFF |
| VTEST:Motherplate Slot | :0000 |
| VTEST:SUBBUS Port | :2211 |
| VTEST:Memory Type | :0000 |
| VTEST:Start Address(LSH) | :0000 |

```
VTEST:Start Address(MSH)                            :0000
VTEST:Code/Data Info Length                         :0000
FITS Results:
001C C990 0000 990C 0753 0197 A800 3236 C210 0000 990C 0703 007B A800 303E
C310 0000 990C 0703 000F A800 323A C910 0000 990C 0703 0097 0800 3236

!VTEST:VTEST Command Type                       :0022
    !VTEST:Length Of Block                          :00FA
    !VTEST:Core Port                                :FFFF
    !VTEST:Motherplate Slot                         :0000
    !VTEST:SUBBUS Port                              :2211
    !VTEST:Memory Type                              :0000
    !VTEST:Start Address(LSH)                       :0000
    !VTEST:Start Address(MSH)                       :0000
    !VTEST:Code/Data Info Length                    :00F3
   800 005E E800 A00C 0038 0000 0000 0004 00A0 E000 A00C 0038 0000 0000 1004 00A1
E000 B00C 0078 FFCD 70FF 0474 FFB3 0027 44C8 027C 7F02 D000 C800 E800 E800 A00C
0038 0000 0000 0004 00A0 E000 A00C 0038 0000 0000 9004 00A0 E000 B00C 0090 0044
0000 0081 E985 1574 A648 52C0 BB0F B5BB D000 C800 E800 E800 A00C 0038 0000 000C
0004 00A0 E000 A00C 0038 0000 0000 1004 00A0 E000 B00C 0090 0044 0000 0081 0705
1574 A648 51C0 550F 5555 D000 C800 E800 E800 A00C 0038 0000 0000 0004 00A0 E000
A00C 0038 0000 0000 0004 00A0 E000 B00C 0090 0044 0000 0081 0005 1574 A648 53C0
770F 7577 D000 C800 E800 E800 A00C 0038 0000 0000 0004 00A0 E000 A00C 0038 000C
0000 8004 00A0 E000 B00C 0090 0044 0000 0081 3100 1574 0648 F2C0 BB0F B0BB D000
C800 E800 E800 A00C 0038 0000 0000 0004 00A0 E000 A00C 0038 0000 0000 9004 00A0
E000 A00C 0008 0028 880B 0070 A00C 0008 0008 E800 E800 A00C 0038 0000 0000 0004
00A0 E000 A00C 0038 0000 0000 1004 00A0 E000 A00C 0008 0028 880B 0070 A00C 0008
 008 E800 E800 A00C 0038 0000 0000 0004 00A0 E000 A00C 0038 0000 0000 0004 00A0
 000 A00C 0008 0028 880B 0070 A00C 0008 0008 E800 E800 A00C 0038 0000 0000 0004
00A0 E000 A00C 0038 0000 0000 8004 00A0 E000 A00C 0008 0028 880B 0070 A00C 0008
0008 E800 000E
VTEST:VTEST Command Type                            :0023
 TEST:Length Of Block                               :0007
VTEST:Core Port                                     :FFFF
VTEST:Motherplate Slot                              :0000
VTEST:SUBBUS Port                                   :2211
VTEST:Memory Type                                   :0000
VTEST:Start Address(LSH)                            :0000
VTEST:Start Address(MSH)                            :0000
VTEST:Code/Data Info Length                         :0000
FITS Results:
001C C990 0000 990C 0773 0197 A800 3236 C210 0000 990C 0703 007B A800 303E
C310 0000 990C 0703 000F A800 323A C910 0000 990C 0703 0097 0800 3236

VTEST:VTEST Command Type                            :0022
VTEST:Length Of Block                               :00FA
VTEST:Core Port                                     :FFFF
VTEST:Motherplate Slot                              :0000
VTEST:SUBBUS Port                                   :2211
VTEST:Memory Type                                   :0000
VTEST:Start Address(LSH)                            :0000
VTEST:Start Address(MSH)                            :0000
VTEST:Code/Data Info Length                         :00F3
E800 005E E800 A00C 0038 0000 0000 0004 00A0 E000 A00C 0038 0000 0000
1004 00A1 E000 B00C 0078 FFCD 70FF 0474 FFB3 0027 44C8 027C 7F02 D000 C800 E800
E800 A00C 0038 0000 0000 0004 00A0 E000 A00C 0038 0000 0000 9004 00A0 E000 B00C
0090 0044 0000 0081 1985 1574 A648 52C0 BB0F B5BB D000 C800 E800 E800 A00C 0038
0000 0000 0004 00A0 E000 A00C 0038 0000 0000 1004 00A0 E000 B00C 0090 0044 000C
0081 0705 1574 A648 51C0 550F 5555 D000 C800 E800 E800 A00C 0038 0000 0000 000-
00A0 E000 A00C 0038 0000 0000 0004 00A0 E000 B00C 0090 0044 0000 0081 0005 157-
A648 53C0 770F 7577 D000 C800 E800 E800 A00C 0038 0000 0000 0004 00A0 E000 A00C
0038 0000 0000 8004 00A0 E000 B00C 0090 0044 0000 0081 3100 1574 0648 F2C0 BB0F
B0BB D000 C800 E800 E800 A00C 0038 0000 0000 0004 00A0 E000 A00C 0038 0000 000C
9004 00A0 E000 A00C 0008 0028 880B 0070 A00C 0008 0008 E800 E800 A00C 0038 000C
0000 0004 00A0 E000 A00C 0038 0000 0000 1004 00A0 E000 A00C 0008 0028 880B 0070
A00C 0008 0008 E800 E800 A00C 0038 0000 0000 0004 00A0 E000 A00C 0038 0000 000C
0004 00A0 E000 A00C 0008 0028 880B 0070 A00C 0008 0008 E800 E800 A00C 0038 000C
0000 0004 00A0 E000 A00C 0038 0000 0000 8004 00A0 E000 A00C 0008 0028 880B 0070
A00C 0008 0008 E800 000E
VTEST:VTEST Command Type                            :0023
VTEST:Length Of Block                               :0007
 TEST:Core Port                                     :FFFF
VTEST:Motherplate Slot                              :0000
VTEST:SUBBUS Port                                   :2211
```

| | |
|---|---|
| VTEST:Memory Type | :0000 |
| TEST:Start Address(LSH) | :0000 |
| VTEST:Start Address(MSH) | :0000 |
| VTEST:Code/Data Info Length | :0000 |

FITS Results:
001C C990 0000 990C 0707 0197 A800 3236 C210 0000 990C 0703 007B A800 303E
C310 0000 990C0703 000F A800 323A C910 0000 990C 0703 0097 0800 3236

| | |
|---|---|
| VTEST:VTEST Command Type | :0022 |
| VTEST:Length Of Block | :00FA |
| VTEST:Core Port | :FFFF |
| VTEST:Motherplate Slot | :0000 |
| VTEST:SUBBUS Port | :2211 |
| VTEST:Memory Type | :0000 |
| VTEST:Start Address(LSH) | :0000 |
| VTEST:Start Address(MSH) | :0000 |
| VTEST:Code/Data Info Length | :00F3 |

E800 005E E800 A00C 0038 0000 0000 0004 00A0 E000 A00C 0038
0000 0000 1004 00A1 E000 B00C 0078 FFCD 70FF 0474 FFB3 0027 44C8 027C 7F02 D00C
300 E800 E800 A00C 0038 0000 0000 0004 00A0 E000 A00C 0038 0000 0000 9004 00AC
E000 B00C 0090 0044 0000 0081 9985 1574 A648 52C0 BB0F B5BB D000 C800 E800 E80C
A00C 0038 0000 0000 0004 00A0 E000 A00C 0038 0000 0000 1004 00A0 E000 B00C 009C
0044 0000 0081 0705 1574 A648 51C0 550F 5555 D000 C800 E800 E800 A00C 0038 000C
0000 0004 00A0 E000 A00C 0038 0000 0000 0004 00A0 E000 B00C 0090 0044 0000 0081
0005 1574 A648 53C0 770F 7577 D000 C800 E800 E800 A00C 0038 0000 0000 0004 00AC
E000 A00C 0038 0000 0000 8004 00A0 E000 B00C 0090 0044 0000 0081 3100 1574 0648
F2C0 BB0F B0BB D000 C800 E800 E800 A00C 0038 0000 0000 0004 00A0 E000 A00C 003E
0000 0000 9004 00A0 E000 A00C 0008 0028 880B 0070 A00C 0008 0008 E800 E800 A00C
0038 0000 0000 0004 00A0 E000 A00C 0038 0000 0000 1004 00A0 E000 A00C 0008 002E
880B 0070 A00C 0008 0008 E800 E800 A00C 0038 0000 0000 0004 00A0 E000 A00C 0008
0000 0004 00A0 E000 A00C 0008 0028 880B 0070 A00C 0008 0008 E800 E800 A00C
0038 0000 0000 0004 00A0 E000 A00C 0038 0000 0000 8004 00A0 E000 A00C 0008 002E
880B 0070 A00C 0008 0008 E800 000E

| | |
|---|---|
| VTEST:VTEST Command Type | :0023 |
| VTEST:Length Of Block | :0007 |
| VTEST:Core Port | :FFFF |
| VTEST:Motherplate Slot | :0000 |
| VTEST:SUBBUS Port | :2211 |
| VTEST:Memory Type | :0000 |
| VTEST:Start Address(LSH) | :0000 |
| VTEST:Start Address(MSH) | :0000 |
| VTEST:Code/Data Info Length | :0000 |

FITS Results:
001C C990 0000 990C 0727 0197 A800 3236 C210 0000 990C 0703 007B A800 303E
C310 0000 990C 0703 000F A800 323A C910 0000 990C 0703 0097 0800 3236

| | |
|---|---|
| VTEST:VTEST Command Type | :0022 |
| VTEST:Length Of Block | :00FA |
| VTEST:Core Port | :FFFF |
| VTEST:Motherplate Slot | :0000 |
| VTEST:SUBBUS Port | :2211 |
| VTEST:Memory Type | :0000 |
| VTEST:Start Address(LSH) | :0000 |
| VTEST:Start Address(MSH) | :0000 |
| VTEST:Code/Data Info Length | :00F3 |

E800 005E E800 A00C 0038 0000 0000 0004 00A0 E000
A00C 0038 0000 0000 1004 00A1 E000 B00C 0078 FFCD 70FF 0474 FFB3 0027 44C8 027C
7F02 D000 C800 E800 E800 A00C 0038 0000 0000 0004 00A0 E000 A00C 0038 0000 000C
0004 00A0 E000 B00C 0090 0044 0000 0081 5985 1574 A648 52C0 BB0F B5BB D000 C80C
00 E800 A00C 0038 0000 0000 0004 00A0 E000 A00C 0038 0000 0000 1004 00A0 E00C
B00C 0090 0044 0000 0081 0705 1574 A648 51C0 550F 5555 D000 C800 E800 E800 A00C
0038 0000 0000 0004 00A0 E000 A00C 0038 0000 0000 0004 00A0 E000 B00C 0090 0044
0000 0081 0005 1574 A648 53C0 770F 7577 D000 C800 E800 E800 A00C 0038 0000 000C
04 00A0 E000 A00C 0038 0000 0000 8004 00A0 E000 B00C 0090 0044 0000 0081 310C
1574 0648 F2C0 BB0F B0BB D000 C800 E800 E800 A00C 0038 0000 0000 0004 00A0 E00C
A00C 0038 0000 0000 9004 00A0 E000 A00C 0008 0028 880B 0070 A00C 0008 0008 E80C
E800 A00C 0038 0000 0000 0004 00A0 E000 A00C 0038 0000 0000 1004 00A0 E000 A00C
0008 0028 880B 0070 A00C 0008 0008 E800 E800 A00C 0038 0000 0000 0004 00A0 E00C
A00C 0038 0000 0000 0004 00A0 E000 A00C 0008 0028 880B 0070 A00C 0008 0008 E80C
E800 A00C 0038 0000 0000 0004 00A0 E000 A00C 0038 0000 0000 8004 00A0 E000 A00C
0008 0028 880B 0070 A00C 0008 0008 E800 000E

| | |
|---|---|
| VTEST:VTEST Command Type | :0023 |
| VTEST:Length Of Block | :0007 |
| VTEST:Core Port | :FFFF |
| VTEST:Motherplate Slot | :0000 |
| VTEST:SUBBUS Port | :2211 |

```
VTEST:Memory Type                              :0000
VTEST:Start Address(LSH)                       :0000
VTEST:Start Address(MSH)                       :0000
VTEST:Code/Data Info Length                    :0000
FITS Results:
001C C990 0000 990C 0747 0197 A800 3236 C210 0000 990C 0703 007B A800 303E
C310 0000 990C 0703 000F A800 323A C910 0000 990C 0703 0097 0800 3236
VTEST:VTEST Command Type                       :0022
VTEST:Length Of Block                          :00FA
VTEST:Core Port                                :FFFF
VTEST:Motherplate Slot                         :0000
VTEST:SUBBUS Port                              :2211
VTEST:Memory Type                              :0000
VTEST:Start Address(LSH)                       :0000
VTEST:Start Address(MSH)                       :0000
VTEST:Code/Data Info Length                    :00F3
E800 005E E800 A00C 0038 0000 0000 0004
00A0 E000 A00C 0038 0000 0000 1004 00A1 E000 B00C 0078 FFCD 70FF 0474 FFB3 0027
44C8 027C 7F02 D000 C800 E800 E800 A00C 0038 0000 0000 0004 00A0 E000 A00C 0038
0000 0000 9004 00A0 E000 B00C 0090 0044 0000 0081 D985 1574 A648 52C0 BB0F B5BB
D000 C800 E800 E800 A00C 0038 0000 0000 0004 00A0 E000 A00C 0038 0000 C000 1004
00A0 E000 B00C 0090 0044 0000 0081 0705 1574 A648 51C0 550F 5555 D000 C800 E800
E800 A00C 0038 0000 0000 0004 00A0 E000 A00C 0038 0000 0000 0004 00A0 E000 B00C
0090 0044 0000 0081 0005 1574 A648 53C0 770F 7577 D000 C800 E800 E800 A00C 0038
0000 0000 0004 00A0 E000 A00C 0038 0000 0000 8004 00A0 E000 B00C 0090 0044 0000
0081 3100 1574 0648 F2C0 BB0F B0BB D000 C800 E800 E800 A00C 0038 0000 0000 0004
00A0 E000 A00C 0038 0000 0000 9004 00A0 E000 A00C 0008 0028 880B 0070 A00C 0008
0008 E800 E800 A00C 0038 0000 0000 0004 00A0 E000 A00C 0038 0000 0000 1004 00A0
E000 A00C 0008 0028 880B 0070 A00C 0008 0008 E800 E800 A00C 0038 0000 0000 0004
00A0 E000 A00C 0038 0000 0000 0004 00A0 E000 A00C 0008 0028 880B 0070 A00C 0008
0008 E800 E800 A00C 0038 0000 0000 0004 00A0 E000 A00C 0038 0000 0000 8004 00A0
E000 A00C 0008 0028 880B 0070 A00C 0008 0008 E800 000E
VTEST:VTEST Command Type                       :0023
VTEST:Length Of Block                          :0007
VTEST:Core Port                                :FFFF
VTEST:Motherplate Slot                         :0000
VTEST:SUBBUS Port                              :2211
VTEST:Memory Type                              :0000
VTEST:Start Address(LSH)                       :0000
VTEST:Start Address(MSH)                       :0000
VTEST:Code/Data Info Length                    :0000
FITS Results:
001C C990 0000 990C 0767 0197 A800 3236 C210 0000 990C 0703 007B A800 303E
 310 0000 990C 0703 000F A800 323A C910 0000 990C 0703 0097 0800 3236
VTEST:VTEST Command Type                       :0022
VTEST:Length Of Block                          :00FA
VTEST:Core Port                                :FFFF
VTEST:Motherplate Slot                         :0000
VTEST:SUBBUS Port                              :2211
VTEST:Memory Type                              :0000
VTEST:Start Address(LSH)                       :0000
VTEST:Start Address(MSH)                       :0000
VTEST:Code/Data Info Length          -         :00F3
E800 005E E800 A00C 0038 0000
0000 0004 00A0 E000 A00C 0038 0000 0000 1004 00A1 E000 B00C 0078 FFCD 70FF 0474
FFB3 0027 44C8 027C 7F02 D000 C800 E800 E800 A00C 0038 0000 0000 0004 00A0 E00C
A00C 0038 0000 0000 9004 00A0 E000 B00C 0090 0044 0000 0081 3985 1574 A648 52CC
BB0F B5BB D000 C800 E800 E800 A00C 0038 0000 0000 0004 00A0 E000 A00C 0038 000C
0000 1004 00A0 E000 B00C 0090 0044 0000 0081 0705 1574 A648 51C0 550F 5555 D00C
 800 E800 E800 A00C 0038 0000 0000 0004 00A0 E000 A00C 0038 0000 0000 0004 00A0
 000 B00C 0090 0044 0000 0081 0005 1574 A648 53C0 770F 7577 D000 C800 E800 E80C
A00C 0038 0000 0000 0004 00A0 E000 A00C 0038 0000 0000 8004 00A0 E000 B00C 009C
0044 0000 0081 3100 1574 0648 F2C0 BB0F B0BB D000 C800 E800 E800 A00C 0038 000C
0000 0004 00A0 E000 A00C 0038 0000 0000 9004 00A0 E000 A00C 0008 0028 880B 007C
 00C 0008 0008 E800 E800 A00C 0038 0000 0000 0004 00A0 E000 A00C 0038 0000 000C
1004 00A0 E000 A00C 0008 0028 880B 0070 A00C 0008 0008 E800 E800 A00C 0038 000C
0000 0004 00A0 E000 A00C 0038 0000 0000 0004 00A0 E000 A00C 0008 0028 880B 007C
A00C 0008 0008 E800 E800 A00C 0038 0000 0000 0004 00A0 E000 A00C 0038 0000 000C
8004 00A0 E000 A00C 0008 0028 880B 0070 A00C 0008 0008 E800 000E
VTEST:VTEST Command Type                       :0023
VTEST:Length Of Block                          :0007
VTEST:Core Port                                :FFFF
VTEST:Motherplate Slot                         :0000
VTEST:SUBBUS Port                              :2211
```

```
VTEST:Memory Type                                       :0000
VTEST:Start Address(LSH)                                :0000
VTEST:Start Address(MSH)                                :0000
VTEST:Code/Data Info Length                             :0000
FITS Results:
001C C990 0000 990C 0717 0197 A800 3236 C210 0000 990C 0703 007B A800 303E
C310 0000 990C 0703 000F A800 323A C910 0000 990C 0703 0097 0800 3236
VTEST:VTEST Command Type                                :0022
VTEST:Length Of Block                                   :00FA
VTEST:Core Port                                         :FFFF
VTEST:Motherplate Slot                                  :0000
VTEST:SUBBUS Port                                       :2211
VTEST:Memory Type                                       :0000
VTEST:Start Address(LSH)                                :0000
VTEST:Start Address(MSH)                                :0000
VTEST:Code/Data Info Length                             :00F3
E800 005E E800 A00C
0038 0000 0000 0004 00A0 E000 A00C 0038 0000 0000 1004 00A1 E000 B00C 0078 FFCI
70FF 0474 FFB3 0027 44C8 027C 7F02 D000 C800 E800 E800 A00C 0038 0000 0000 000·
00A0 E000 A00C 0038 0000 0000 9004 00A0 E000 B00C 0090 0044 0000 0081 B985 157·
A648 52C0 BB0F B5BB D000 C800 E800 E800 A00C 0038 0000 0000 0004 00A0 E000 A00C
0038 0000 0000 1004 00A0 E000 B00C 0090 0044 0000 0081 0705 1574 A648 51C0 550I
5555 D000 C800 E800 E800 A00C 0038 0000 0000 0004 00A0 E000 A00C 0038 0000 000C
0004 00A0 E000 B00C 0090 0044 0000 0081 0005 1574 A648 53C0 770F 7577 D000 C80C
E800 E800 A00C 0038 0000 0000 0004 00A0 E000 A00C 0038 0000 0000 8004 00A0 E00C
B00C 0090 0044 0000 0081 3100 1574 0648 F2C0 BB0F B0BB D000 C800 E800 E800 A00C
0038 0000 0000 0004 00A0 E000 A00C 0038 0000 0000 9004 00A0 E000 A00C 0008 002E
880B 0070 A00C 0008 0008 E800 E800 A00C 0038 0000 0000 0004 00A0 E000 A00C 003E
0000 0000 1004 00A0 E000 A00C 0008 0028 880B 0070 A00C 0008 0008 E800 E800 A00C
038 0000 0000 0004 00A0 E000 A00C 0038 0000 0000 0004 00A0 E000 A00C 0008 002E
880B 0070 A00C 0008 0008 E800 E800 A00C 0038 0000 0000 0004 00A0 E000 A00C 003E
0000 0000 8004 00A0 E000 A00C 0008 0028 880B 0070 A00C 0008 0008 E800 000E
VTEST:VTEST Command Type                                :0023
 TEST:Length Of Block                                   :0007
VTEST:Core Port                                         :FFFF
VTEST:Motherplate Slot                                  :0000
VTEST:SUBBUS Port                                       :2211
VTEST:Memory Type                                       :0000
VTEST:Start Address(LSH)                                :0000
VTEST:Start Address(MSH)                                :0000
VTEST:Code/Data Info Length                             :0000
FITS Results:
001C C990 0000 990C 0737 0197 A800 3236 C210 0000 990C 0703 007B A800 303E
C310 0000 990C 0703 000F A800 323A C910 0000 990C 0703 0097 0800 3236
VTEST:VTEST Command Type                                :0022
 TEST:Length Of Block                                   :00FA
.TEST:Core Port                                         :FFFF
VTEST:Motherplate Slot                                  :0000
VTEST:SUBBUS Port                                       :2211
VTEST:Memory Type                                       :0000
 TEST:Start Address(LSH)                                :0000
VTEST:Start Address(MSH)                                :0000
VTEST:Code/Data Info Length                             :00F3
E800 005E
E800 A00C 0038 0000 0000 0004 00A0 E000 A00C 0038 0000 0000 1004 00A1 E000 B00C
0078 FFCD 70FF 0474 FFB3 0027 44C8 027C 7F02 D000 C800 E800 E800 A00C 0038 000C
0000 0004 00A0 E000 A00C 0038 0000 0000 9004 00A0 E000 B00C 0090 0044 0000 0081
7985 1574 A648 52C0 BB0F B5BB D000 C800 E800 E800 A00C 0038 0000 0000 0004 00A(
E000 A00C 0038 0000 0000 1004 00A0 E000 B00C 0090 0044 0000 0081 0705 1574 A64E
51C0 550F 5555 D000 C800 E800 E800 A00C 0038 0000 0000 0004 00A0 E000 A00C 003E
0000 0000 0004 00A0 E000 B00C 0090 0044 0000 0081 0005 1574 A648 53C0 770F 7577
D000 C800 E800 E800 A00C 0038 0000 0000 0004 00A0 E000 A00C 0038 0000 0000 800·
00A0 E000 B00C 0090 0044 0000 0081 3100 1574 0648 F2C0 BB0F B0BB D000 C800 E80C
E800 A00C 0038 0000 0000 0004 00A0 E000 A00C 0038 0000 0000 9004 00A0 E000 A00C
0008 0028 880B 0070 A00C 0008 0008 E800 E800 A00C 0038 0000 0000 0004 00A0 E00C
A00C 0038 0000 0000 1004 00A0 E000 A00C 0008 0028 880B 0070 A00C 0008 0008 E80C
E800 A00C 0038 0000 0000 0004 00A0 E000 A00C 0038 0000 0000 0004 00A0 E000 A00C
0008 0028 880B 0070 A00C 0008 0008 E800 E800 A00C 0038 0000 0000 0004 00A0 E00C
A00C 0038 0000 0000 8004 00A0 E000 A00C 0008 0028 880B 0070 A00C 0008 0008 E80C
000E
VTEST:VTEST Command Type                                :0023
VTEST:Length Of Block                                   :0007
VTEST:Core Port                                         :FFFF
```

```
 EST:Motherplate Slot                                :0000
  EST:SUBBUS Port                                    :2211
 VTEST:Memory Type                                   :0000
 VTEST:Start Address(LSH)                            :0000
 VTEST:Start Address(MSH)                            :0000
 VTEST:Code/Data Info Length                         :0000
FITS Results:
001C C990 0000 990C 0757 0197 A800 3236 C210 0000 990C 0703 007B A800 303E
C310 0000 990C 0703 000F A800 323A C910 0000 990C 0703 0097 0800 3236
VTEST:VTEST Command Type                             :0022
VTEST:Length Of Block                                :00FA
VTEST:Core Port                                      :FFFF
VTEST:Motherplate Slot                               :0000
VTEST:SUBBUS Port                                    :2211
VTEST:Memory Type                                    :0000
 TEST:Start Address(LSH)                             :0000
 TEST:Start Address(MSH)                             :0000
VTEST:Code/Data Info Length                          :00F3
E800 005E E800 A00C 0038 0000 0000 0004 00A0 E000 A00C 0038 0000 0000 1004 00A
E000 B00C 0078 FFCD 70FF 0474 FFB3 0027 44C8 027C 7F02 D000 C800 E800 E800 A00(
 038 0000 0000 0004 00A0 E000 A00C 0038 0000 0000 9004 00A0 E000 B00C 0090 004.
0000 0081 F985 1574 A648 52C0 BB0F B5BB D000 C800 E800 E800 A00C 0038 0000 000(
0004 00A0 E000 A00C 0038 0000 0000 1004 00A0 E000 B00C 0090 0044 0000 0081 070!
1574 A648 51C0 550F 5555 D000 C800 E800 E800 A00C 0038 0000 0000 0004 00A0 E00(
A00C 0038 0000 0000 0004 00A0 E000 B00C 0090 0044 0000 0081 0005 1574 A648 53C(
770F 7577 D000 C800 E800 E800 A00C 0038 0000 0000 0004 00A0 E000 A00C 0038 000(
0000 8004 00A0 E000 B00C 0090 0044 0000 0081 3100 1574 0648 F2C0 BB0F B0BB D00(
C800 E800 E800 A00C 0038 0000 0000 0004 00A0 E000 A00C 0038 0000 0000 9004 00A(
E000 A00C 0008 0028 880B 0070 A00C 0008 0008 E800 E800 A00C 0038 0000 0000 000
00A0 E000 A00C 0038 0000 0000 1004 00A0 E000 A00C 0008 0028 880B 0070 A00C 000
0008 E800 E800 A00C 0038 0000 0000 0004 00A0 E000 A00C 0038 0000 0000 0004 00A(
E000 A00C 0008 0028 880B 0070 A00C 0008 0008 E800 E800 A00C 0038 0000 0000 000
 0A0 E000 A00C 0038 0000 0000 8004 00A0 E000 A00C 0008 0028 880B 0070 A00C 000{
 008 E800 000E
VTEST:VTEST Command Type                             :0023
VTEST:Length Of Block                                :0007
 TEST:Core Port                                      :FFFF
 TEST:Motherplate Slot                               :0000
VTEST:SUBBUS Port                                    :2211
VTEST:Memory Type                                    :0000
VTEST:Start Address(LSH)                             :0000
VTEST:Start Address(MSH)                             :0000
VTEST:Code/Data Info Length                          :0000
FITS Results:
001C C990 0000 990C 0777 0197 A800 3236 C210 0000 990C 0703 007B A800 303E
C310 0000 990C 0703 000F A800 323A C910 0000 990C 0703 0097 0800 3236
VTEST:VTEST Command Type                             :0022
VTEST:Length Of Block                                :00FA
VTEST:Core Port                                      :FFFF
VTEST:Motherplate Slot                               :0000
VTEST:SUBBUS Port                                    :2211
VTEST:Memory Type                                    :0000
VTEST:Start Address(LSH)                             :0000
VTEST:Start Address(MSH)                             :0000
VTEST:Code/Data Info Length                          :00F3
E800 005E E800 A00C 0038 0000 0000 0004 00A0 E000 A00C 0038 0000 0000
1004 00A1 E000 B00C 0078 FFCD 70FF 0474 FFB3 0027 44C8 027C 7F02 D000 C800 E80(
E800 A00C 0038 0000 0000 0004 00A0 E000 A00C 0038 0000 0000 9004 00A0 E000 B00'
0090 0044 0000 0081 0985 1574 A648 52C0 BB0F B5BB D000 C800 E800 E800 A00C 003:
0000 0000 0004 00A0 E000 A00C 0038 0000 0000 1004 00A0 E000 B00C 0090 0044 000
0081 8705 1574 A648 51C0 550F 5555 D000 C800 E800 A00C 0038 0000 0000 000
00A0 E000 A00C 0038 0000 0000 0004 00A0 E000 B00C 0090 0044 0000 0081 0005 157
A648 53C0 770F 7577 D000 C800 E800 E800 A00C 0038 0000 0000 0004 00A0 E000 A00(
0038 0000 0000 8004 00A0 E000 B00C 0090 0044 0000 0081 3100 1574 0648 F2C0 BB0I
B0BB D000 C800 E800 E800 A00C 0038 0000 0000 0004 00A0 E000 A00C 0038 0000 000(
9004 00A0 E000 A00C 0008 0028 880B 0070 A00C 0008 0008 E800 E800 A00C 0038 000(
0000 0004 00A0 E000 A00C 0038 0000 0000 1004 00A0 E000 A00C 0008 0028 880B 007(
A00C 0008 0008 E800 E800 A00C 0038 0000 0000 0004 00A0 E000 A00C 0038 0000 000(
0004 00A0 E000 A00C 0008 0028 880B 0070 A00C 0008 0008 E800 E800 A00C 0038 000(
0000 0004 00A0 E000 A00C 0038 0000 0000 8004 00A0 E000 A00C 0008 0028 880B 007(
A00C 0008 0008 E800 000E
VTEST:VTEST Command Type                             :0023
VTEST:Length Of Block                                :0007
VTEST:Core Port                                      :FFFF
```

```
VTEST:Motherplate Slot                            :0000
VTEST:SUBBUS Port                                 :2211
 EST:Memory Type                                  :0000
VTEST:Start Address(LSH)                          :0000
VTEST:Start Address(MSH)                          :0000
VTEST:Code/Data Info Length              -        :0000
 ITS Results:
 001C C990 0000 990C 0757 0197 A800 3236 C210 0000 990C 0777 007B A800 303E
 C310 0000 990C 0747 000F A800 323A C910 0000 990C 0717 0097 0800 3236 0000

0000 = 0000 0001 0002 0003 0004 0005 0006 0007
 0008 = 0008 0009 000A 000B 000C 000D 000E 000
 0010 = CAFE
```

APPENDIX D

This file contains the data transfers between the vax
and the console during a read of spe0 memory for
locations 0 to 80h

```
SD [VPSP.CORE.FITSCOW]
 ! [VPSP.CORE.FITSCOW]
 Ord_spe0_mem.fit 0 80
  !VTEST:VTEST Command Type                       :0022
  !VTEST:Length Of Block                          :00B2
  !VTEST:Core Port                                :FFFF
  !VTEST:Motherplate Slot                         :0000
  !VTEST:SUBBUS Port                              :2211
  !VTEST:Memory Type                              :0009
  !VTEST:Start Address(LSH)                       :0000
  !VTEST:Start Address(MSH)                       :0000
  !VTEST:Code/Data Info Length                    :00AB
 E800 005E 001A 0000 077F 0018 0011 0016 0100 0000 877F 03C3 03D2 03E1 03F0 E00
 0018 0001 0016 0100 0010 877F 03C7 03D6 03E5 03F4 E000 0018 0000 0016 0100 002
 877F 03CB 03DA 03E9 03F8 E000 0018 0010 0016 0100 0030 877F 03CF 03DE 03ED 03F
 E000 0018 0011 A00C 0008 0020 880B 0038 0018 0001 A00C 0008 0020 880B 0038 001
 0000 A00C 0008 0020 880B 0038 0018 0010 A00C 0008 0020 880B 0038 0014 0010 000
 0035 0036 0034 0032 0075 0076 0074 0072 00B5 00B6 00B4 00B2 00F5 00F6 00F4 00F
 001C 077F 0018 0011 0016 8100 0000 877F 03C3 03D2 03E1 03F0 E000 0018 0001 001
 8100 0010 877F 03C7 03D6 03E5 03F4 E000 0018 0000 0016 8100 0020 877F 03CB 03D
 03E9 03F8 E000 0018 0010 0016 8100 0030 877F 03CF 03DE 03ED 03FC E000 0010 008
 113C 0018 0011 0016 4100 0000 E000 0018 0001 0016 4100 0010 E000 0018 0000 001
 4100 0020 E000 0018 0010 0016 4100 0030 E000 E800 000E
 exam 129c:131b
  !VTEST:VTEST Command Type                       :0012
  !VTEST:Length Of Block                          :0007
  !VTEST:Core Port                                :FFFF
  !VTEST:Motherplate Slot                         :0000
  !VTEST:SUBBUS Port                              :2211
  !VTEST:Memory Type                              :0009
  !VTEST:Start Address(LSH)                       :129C
  !VTEST:Start Address(MSH)                       :0000
  !VTEST:Code/Data Info Length                    :0081
 129C = 0000 0001 0002 0003 0004 0005 0006 0007
 12A4 = 0008 0009 000A 000B 000C 000D 000E 000F
 12AC = CAFE FFFF FFFF FFFF FFFF FFFF FFFF FFFF
 12B4 = FFFF FFFF FFFF FFFF FFFF FFFF FFFF FFFF
 12BC = FFFF FFFF FFFF FFFF FFFF FFFF FFFF FFFF
 12C4 = FFFF FFFF FFFF FFFF FFFF FFFF FFFF FFFF
 12CC = FFFF FFFF FFFF FFFF FFFF FFFF FFFF FFFF
 12D4 = FFFF FFFF FFFF FFFF FFFF FFFF FFFF FFFF
 12DC = FFFF FFFF FFFF FFFF FFFF FFFF FFFF FFFF
 12E4 = FFFF FFFF FFFF FFFF FFFF FFFF FFFF FFFF
 12EC = FFFF FFFF FFFF FFFF FFFF FFFF FFFF FFFF
 12F4 = FFFF FFFF FFFF FFFF FFFF FFFF FFFF FFFF
 12FC = FFFF FFFF FFFF FFFF FFFF FFFF FFFF FFFF
 1304 = FFFF FFFF FFFF FFFF FFFF FFFF FFFF FFFF
 130C = FFFF FFFF FFFF FFFF FFFF FFFF FFFF FFFF
 1314 = FFFF FFFF FFFF FFFF FFFF FFFF FFFF FFFF
  ! Log closed 17-JAN-90 at 09:10:29
```

What is claimed is:

1. A processor-implemented method for accessing machine state information from a device under test using boundary scan circuitry, wherein said device under test is provided with a debug controller, said debug controller including at least a portion of the command repertoire for said boundary scan circuitry, comprising the steps of:

a) initiating a boundary scan circuity command by means of an external controller, said external controller sending an initiation instruction to a test set;

b) processing said initiation instruction at said test set and transmitting said boundary scan circuitry command from said test set to a console provided in said device under test;

c) transmitting said boundary scan circuitry command from said console to said debug controller;

d) processing said boundary scan circuitry command in said debug controller and transmitting said portion of the command repertoire to a target configured gate array on said device under test, said configured gate array processing said portion of the command repertoire and transmitting an intermediary report of machine state information to said debug controller;

e) processing said intermediary report of machine state information at said debug controller by transmitting follow-up commands to said target configured gate array on said device under test as needed; and f) transmitting a final report of machine state information from said debug controller to said external controller.

2. The method of claim 1 comprising the further step of providing a debug monitor routine resident in said debug controller.

3. The method of claim 1 comprising the further steps of providing overlays for each requested portion of said command repertoire and providing said overlays resident in a wake-up prom.

4. The method of claim 1 comprising the further step of providing a firmware segment in said boundary scan circuitry, said firmware segment containing said portion of said command repertoire, said portion of said command repertoire being downloaded as needed.

* * * * *